United States Patent [19]
Velke

[11] Patent Number: 6,000,705
[45] Date of Patent: *Dec. 14, 1999

[54] SULKY DEVICE WITH TRIPLE PIVOT ATTACHMENT TO MOWER

[75] Inventor: James D. Velke, Poolesville, Md.

[73] Assignee: Wright Mfg., Inc., Gaithersburg, Md.

[*] Notice: This patent is subject to a terminal disclaimer.

[21] Appl. No.: 09/158,080

[22] Filed: Sep. 22, 1998

Related U.S. Application Data

[63] Continuation of application No. 08/708,772, Sep. 5, 1996, Pat. No. 5,882,020, and a continuation of application No. 09/057,581, Apr. 9, 1998, Pat. No. 5,810,371.

[51] Int. Cl.$^6$ ........................................................ B60D 1/14
[52] U.S. Cl. .......................................... 280/32.7; 280/494
[58] Field of Search .................................. 280/32.7, 492, 280/493, 494; 180/15, 16; 56/14.9, 15.7, 15.9

[56] References Cited

U.S. PATENT DOCUMENTS

| | | | |
|---|---|---|---|
| 918,386 | 4/1909 | Spensley | 280/32.7 |
| 1,011,819 | 12/1911 | Krueger et al. | 280/32.7 |
| 2,144,806 | 1/1939 | Meagher et al. | 280/494 |
| 2,210,008 | 8/1940 | Rodin | 280/103 |
| 3,485,314 | 12/1969 | Herr | 180/19.1 |
| 3,580,612 | 5/1971 | Pearson | 280/492 |
| 4,114,919 | 9/1978 | Stowe | 280/292 |
| 4,711,461 | 12/1987 | Fromberg | 280/494 |
| 4,828,282 | 5/1989 | Pinto | 280/32.7 |
| 4,878,339 | 11/1989 | Marier et al. | 280/32.7 |
| 4,989,351 | 2/1991 | Shear | 280/32.7 |
| 5,004,251 | 4/1991 | Velke et al. | 280/32.7 |
| 5,081,826 | 1/1992 | Mackay | 54/2 |
| 5,186,483 | 2/1993 | Sheppard | 280/494 |
| 5,355,971 | 10/1994 | Austin et al. | 180/53.1 |
| 5,413,364 | 5/1995 | Hafendorfer | 280/32.7 |
| 5,423,565 | 6/1995 | Smith | 280/411.1 |
| 5,575,140 | 11/1996 | Bermes et al. | 56/14.7 |
| 5,785,453 | 7/1998 | Marty et al. | 280/32.7 |

FOREIGN PATENT DOCUMENTS

| | | | |
|---|---|---|---|
| 1302660 | 6/1961 | France . | |
| 664858 | 5/1979 | U.S.S.R. . | |
| 2249532 | 5/1992 | United Kingdom | 280/492 |

OTHER PUBLICATIONS

Lewis Manufacturing Introduces the Lew Step, 1992.

*Primary Examiner*—J. J. Swann
*Assistant Examiner*—Frank B Vanaman
*Attorney, Agent, or Firm*—Joseph A. Rhoa

[57] ABSTRACT

This invention relates to a stand-on sulky device to be attached to the rear of a self-propelled power mower or other self-propelled vehicle. The sulky includes first, second, and third pivots to provide improved maneuverability of the two-wheeled sulky platform during operation. The first and third pivots are arranged substantially parallel to the ground during sulky operation and are vertically spaced from one another thereby resulting in improved sulky performance. According to certain embodiments, the sulky includes a design allowing for a more compact storage position wherein the platform is hung from the mower handle bars with the upper or foot receiving surface of the platform facing away from the mower and the first arm being received in an optional recess defined in the bottom of the mower so as to restrict swinging movement of the platform while in storage.

15 Claims, 10 Drawing Sheets

SULKY DEVICE WITH TRIPLE PIVOT ATTACHMENT TO MOWER

This application is a continuation of U.S. patent application Ser. No. 08/708,772 filed Sep. 5, 1996 (now U.S. Pat. No. 5,882,020), and a continuation of U.S. patent application Ser. No. 09/057,581 filed Apr. 9, 1998 (now U.S. Pat. No. 5,810,371), both of which are incorporated herein by reference.

This invention relates to a sulky device adapted to be attached to a self-propelled power mower or the like. More particularly, this invention relates to a two-wheeled sulky device including three separate pivots and two coupling arms of predetermined sizes for enabling improved performance and storage.

BACKGROUND OF THE INVENTION

Sulky devices attachable to self-propelled power mowers are old and well-known throughout the art. For example, see U.S. Pat. Nos. 4,828,282; 5,004,251; and 5,413,364.

U.S. Pat. No. 5,004,251, commonly owned along with the instant application, discloses a one-wheel sulky adapted to be attached to and pulled behind a power mower. Due to the single wheel, only two pivots are needed. The mechanism for attaching the sulky of the '251 patent to the power mower includes a pair of pivot members with an elongated arm therebetween, the arm being connected to the power mower via the first pivot at one end with the second pivot at the other end enabling the platform ease of operation and storage. While the sulky device of the '251 patent has experienced commercial acceptance in the marketplace, many operators prefer two-wheeled sulky devices as opposed to the single-wheeled type illustrated in the '251 patent.

Two-wheeled stand-on sulky devices are also old and well-known throughout the art. See, for example, U.S. Pat. Nos. 3,485,314; 4,828,282; and 5,413,364.

U.S. Pat. No. 3,485,314 discloses a two-wheeled trailer adapted to be towed behind a power driven tractor. Unfortunately, the trailer of the '314 patent including its attachment mechanism to the tractor, is undesirable in view of its lack of maneuverability during operation and storage.

U.S. Pat. No. 4,828,282 discloses a sulky device adapted to be towed behind a self-propelled power mower including a pair of wheels between which a platform is disposed. A rigid towbar assembly is provided as a coupling mechanism between the mower and platform. Again, the sulky of the '282 patent is undesirable in view of its lack of maneuverability and lack of an adequate storage position.

U.S. Pat. No. 5,413,364 discloses a two-wheeled sulky device including three separate pivot members in the coupling mechanism. Unfortunately, the design of the coupling mechanism of the '364 patent, including its three pivot members and attachment thereto, is undesirable in that: (i) it limits maneuverability of the sulky during operation due to the co-planar orientation of all three pivots; (ii) the platform and wheels are unable to swing even part of the way under the front arm rendering the device susceptible to damage and undesirable in reverse modes; (iii) the mower of the '364 patent cannot safely and reasonably be driven if the sulky is stored because the co-planar design of the horizontal arms causes the platform, when stored, to interfere with the mower's handle bars; and (iv) the rear horizontal arm is relatively long compared to the other or front horizontal arm with its hitch thereby causing the sulky of the '364 patent to cut corners on turns during operation and also causing the operator to move further than necessary off-center relative to the mower handle bars during such turns.

Another prior art two-wheeled sulky device in commerce at least as early as 1992, is known as the "E-Z Rider" or "Lewstep". Unfortunately, this "E-Z Rider" two-wheeled triple pivot sulky is similar in most respects to that disclosed in U.S. Pat. No. 5,413,364 and therefore is susceptible to the same problems as discussed above.

It is apparent from the above that there exists a need in the art for an improved two-wheeled sulky device, having three pivot members, with hitch, and arms of lengths so that the improved sulky (i) has improved maneuverability; (ii) maintains the standing operator more closely centered between the mower handle bars during turns; (iii) has a platform and wheels sized to swing at least part of the way under the front horizontal arm regardless of other parts added that would prevent this; and (iv) has an improved storage position and method\structure for implementing same.

It is a purpose of this invention to fulfill the above-described needs in the art, as well as other needs apparent to the skilled artisan from the following detailed description of this invention.

SUMMARY OF THE INVENTION

Generally speaking, this invention fulfills the above-described needs in the art by providing a stand-on triple-pivot sulky adapted to be attached to a self-propelled vehicle, such as a power mower, for transporting a standing operator, the sulky comprising:

a first elongated arm arranged substantially parallel to the ground during sulky operation, the first arm having a first end and a second end, the first end to be attached to the self-propelled vehicle at a first pivot member arranged transverse to the length of the arm and substantially horizontal relative to the ground, and the second end forming part of a second pivot member;

the second pivot member being oriented substantially vertical (e.g. ±about 15° relative to the vertical) relative to the ground during operation of the sulky; and a third pivot member connected to a platform for supporting the feet of the standing operator, the third pivot member being located substantially below the first arm and substantially parallel (e.g. ±about 20°) to the ground and to the first elongated arm during sulky operation whereby the stand-on triple-pivot sulky has improved maneuverability during operation. The second and third pivots may be reversed in position according to certain embodiments.

This invention further fulfills the above-described needs in the art by providing a sulky for attachment to a self-propelled power mower, the sulky comprising:

a stand-on platform for supporting the feet of a standing operator;

first and second wheels attached to the platform;

a first elongated arm oriented substantially parallel (e.g. ±about 20°) to the ground during operation of the sulky, the first arm including a first end to be attached to the mower at a first pivot, and a second end attached to a second pivot;

a second arm having a portion thereof oriented substantially parallel (e.g. ±about 20°) to the ground and below the first arm during sulky operation, the second arm forming part of a third pivot and including a first end attached to the second pivot and a second end connected to the platform via the third pivot; and wherein the first arm is substantially longer than the portion of the second arm oriented substantially parallel to the ground so that the operator remains substantially centered between handle bars of the mower during turns.

According to certain embodiments, the second arm is substantially L-shaped.

This invention still further fulfills the above-described needs in the art by providing a sulky for attachment to a power mower, the sulky for supporting a standing operator and comprising:

a platform for supporting the operator, the platform having a first upper surface for receiving feet of the operator and a second underneath surface which faces the ground during operation of the sulky and is opposite the first surface;

first and second wheels attached to the platform;

a first arm having a first end to be attached to the mower at a first pivot and a second end connected to a second pivot; and means for allowing the platform to be moved from an operational position where the wheels contact the ground to a storage position where the wheels and platform are above the ground, the means also for enabling the platform to be arranged in the storage position so that the second underneath surface of the platform faces the mower.

According to certain preferred embodiments of this invention, an object is to provide an improved method of moving the sulky from its operational position where the wheels contact the ground to its storage position where the wheels are removed from the ground and the platform is partially supported or suspended by the handle bars, or frame of the mower.

This invention will now be described with reference to certain embodiments thereof as illustrated in the following drawings.

IN THE DRAWINGS

Figure 1:
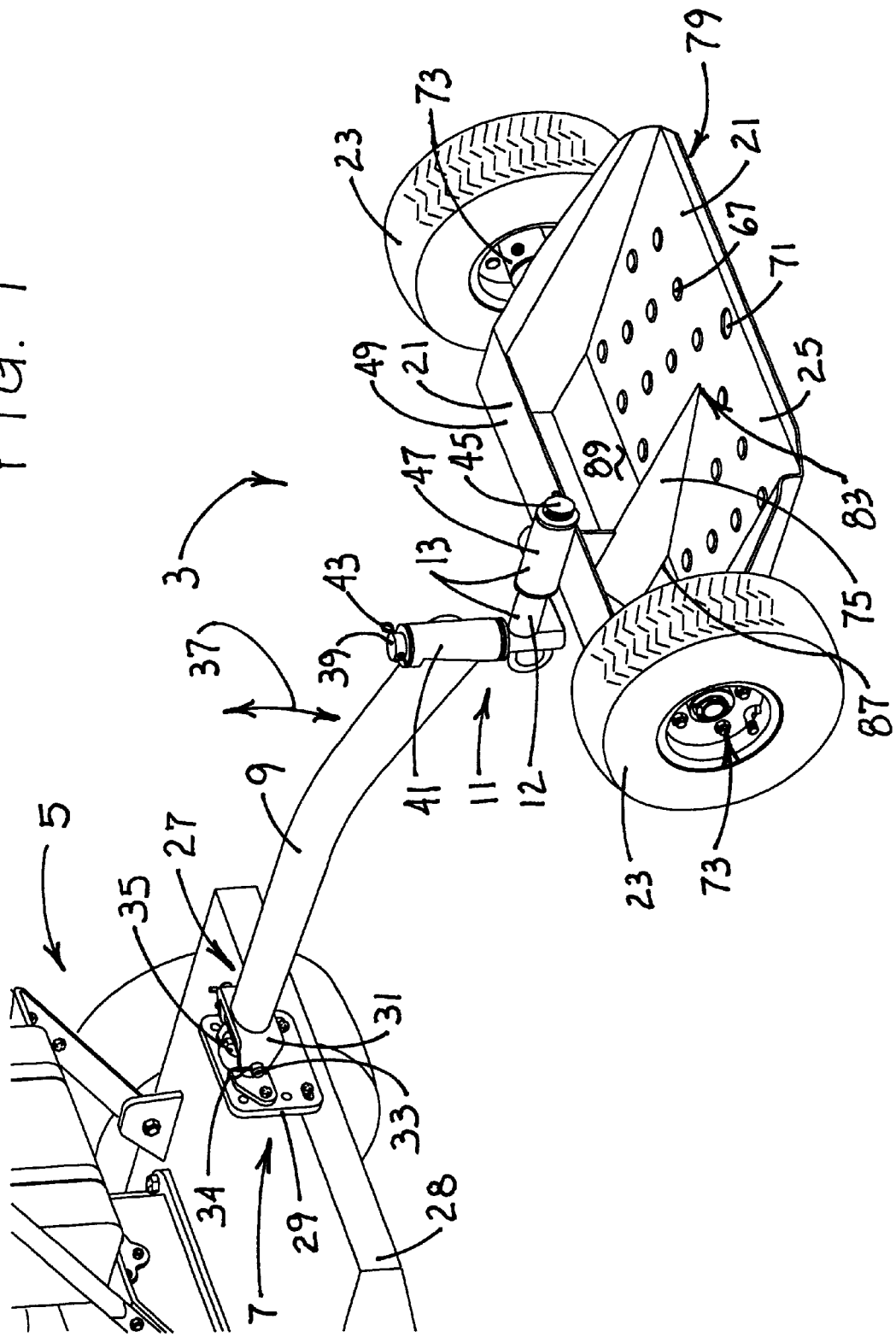
FIG. 1 is a perspective view illustrating a two-wheeled sulky device according to an embodiment of this invention attached to the rear of a self-propelled power mower.

FIGS. 13(a)–13(d) illustrate a two-wheeled sulky being put in the storage position according to another embodiment of this invention.

DETAILED DESCRIPTION OF CERTAIN EMBODIMENTS OF THIS INVENTION

Referring now more particularly to the accompanying drawings in which like reference numerals indicate like parts throughout the several views.

FIG. 1 is a perspective view illustrating stand-on sulky 3 according to an embodiment of this invention, the sulky adapted to be attached to self-propelled vehicle such as a power mower 5 at horizontally oriented pivot 7. Sulky 3 includes elongated arm 9 horizontally arranged so as to be substantially parallel (e.g. ±about 20°) to the ground during operation of the sulky. Sulky 3 further includes pivot 11 vertically arranged during sulky 3 operation so as to be substantially perpendicular relative to both the ground and front elongated arm 9, and horizontal pivot 13 which is arranged so as to be substantially parallel to the ground during sulky operation. Substantially vertical pivot 11 is made up of outer tube 41 and shaft 39, while horizontal pivot 13 is made up of tube 47 attached to platform 21, and horizontal shaft portion 45 of L-shaped arm 12.

As can be seen in FIG. 1, vertical pivot 11 is disposed between and connected to elongated horizontal arm 9 and horizontal pivot 13. L-shaped arm 12 includes substantially perpendicular shafts 39 and 45 which form portions of vertical pivot 11 and horizontal pivot 13 respectively. According to certain alternative embodiments, arm 12 may be T-shaped, V-shaped, or the like.

Horizontal pivot 7 allows front arm 9 to be connected to mower 5 and pivot vertically 37 (see FIG. 1) with respect thereto. Vertical pivot 11 is interposed between front arm 9 and pivot 13 thereby permitting these two elements to pivot on different planes relative to one another about shaft 39. Pivot 13 is attached to stand-on platform 21 so as to allow platform 21 to pivot relative to or about shaft 45 as wheels 23 attached to the platform go over bumps and the like during sulky operation. Standing or top surface 25 of platform 21 is adapted to support the feet of the standing operator in control of mower 5.

Because front arm 9 and pivot 13 are substantially horizontally oriented (i.e. ±about 20° from perfectly horizontal) relative to the ground during sulky operation (FIGS. 1–3), they will be referred to herein as "horizontal" members.

Elongated arm 9 of the sulky coupling mechanism includes front end 27 which forms a portion of pivot 7 that is attached to flat plate 29. Plate 29 is affixed to the rear vertical surface 28 of mower 5. Yoke or bracket 31 of pivot 7 includes a pair of arms extending parallel to one another from either side of arm 9. Pivot 7 also includes T-shaped extension member 35 affixed to and extending from plate 29 between the arms of yoke 31, and pivot pin 33 which is inserted through the arms of yoke 31 and T-shaped extension 35. The pivot axis of pivot 7 is defined by pivot pin 33 and the corresponding holes in the yoke. Yoke 31, and its two arms, are rigidly attached to or are part of arm 9. Retainer pin 34 which fits through an end of pivot pin 33 holds pivot assembly 7 together.

The other end of arm 9, in conjunction with vertical tube 41 and vertical shaft 39, forms substantially vertical pivot member 11. Tube 41 is rigidly attached to or is part of arm 9. Tube 41 slides over and around shaft portion 39 of L-shaped arm member 12. Retainer pin 43 extending through shaft 39 above the tube maintains tube 41 in place vertically relative to the shaft 39. As in conventional pivots, members 39 and 41 are coaxial and rotate relative to one another about their common axis to form the pivot.

Horizontal pivot 13 includes shaft 45 which is a part of L-shaped arm 12, and is surrounded by tube 47 which is attached to or is part of horizontal top portion 49 of platform 21. Pivot 13 permits, for example, platform 21 to pivot about shaft 45 so that the left-hand wheel 23 may rise while the right-hand wheel 23 is lowered independent from mower wheels during sulky operation. The shafts of the pivots discussed above are coaxial with their respective tubes or surrounding members thereby resulting in the recited pivoting actions. These pivots in combination with arms 9 and 12 allow sulky 3 improved maneuverability and performance relative to prior art two-wheeled sulky devices.

As illustrated in FIG. 1 and the other figures herein, elongated arm 9 is substantially longer than the horizontal shaft portion 45 of L-shaped arm 12. Arm 9 is at least about twice as long as shaft portion 45, and preferably at least about three times as long (e.g. see FIG. 4). The extended length of arm 9 relative to shaft 45 and pivot 13 allows platform 21, along with wheels 23, to more closely follow the trail or path of mower 5 as it maneuvers around corners, obstacles, and the like, as opposed to cutting corners which was a problem discussed above with respect to the prior art. Accordingly, when the standing operator maneuvers mower 5 around a tree, for example, the length of elongated arm 9 relative to shaft 45 causes platform 21 to more closely follow the trail of the mower as opposed to cutting the corner of the turn and running into the tree. The length of arm 9 relative to shaft 45 also permits platform 21 to swing 360° about pivot 11 without the mower substantially obstructing its path.

Platform 21 and wheels 23 are of a size enabling them both to pivot 360° (or substantially greater than 220° according to certain embodiments) about vertical pivot 11 thereby enabling both the platform and wheels to swing substantially underneath of arm 9 both during operation and storage. The ability of platform 21 and wheels 23 to swing at least partly underneath arm 9 about pivot 11 allows improved performance in reverse, renders the overall system less susceptible to damage, and permits an improved storage position as will be discussed below. This swingability of platform 21 and wheels 23 underneath of arm 9 minimizes the wheels 23 dragging laterally during reverse operations, this being an improvement over certain prior art two-wheeled sulky devices.

It is also worth noting that fender(s) or other additional parts (not shown) may be provided over wheels 23. Regardless of whether such fender(s) or other parts are sized so as to fit under arm 9, the platform 21 and wheels 23 should be sized to fit under arm 9 when swung about pivot 11.

The extended length of arm 9 relative to shaft 45 also allows the standing operator to remain substantially centered between handle bars 49 (see FIGS. 3–6) of mower 5 during turns. If arm 9 was not substantially longer than shaft 45, then the operator would move further off-center relative to the handle bars during turning. This would be undesirable. Accordingly, by designing shaft 45 to be relatively short compared to arm 9, the standing operator remains centered or substantially centered between handle bars 49 during turns.

Figure 2:
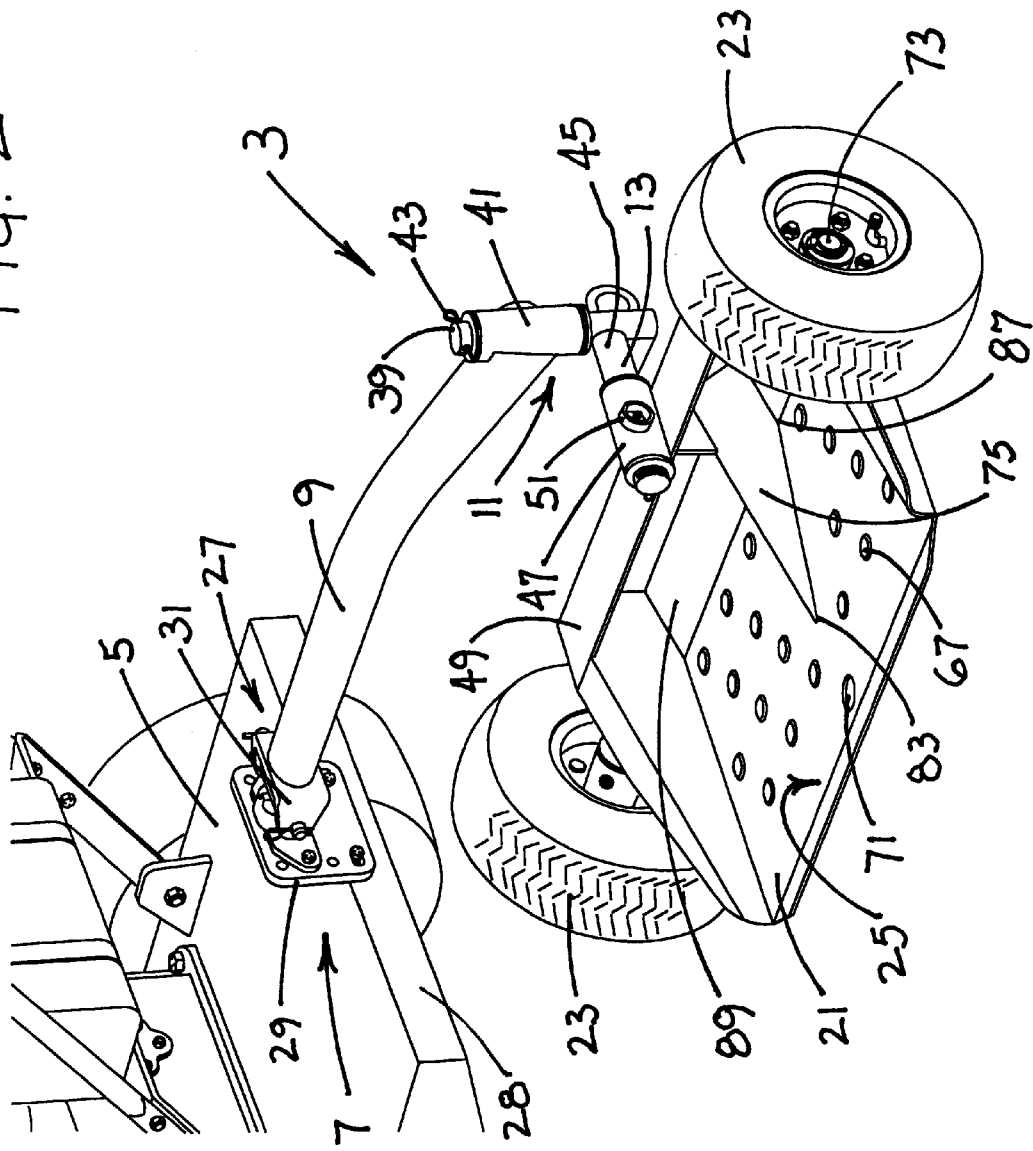
FIG. 2 is a perspective view of the two-wheeled sulky device of FIG. 1, FIG. 2 illustrating the sulky device with the platform pivoted 90° about the central or second pivot relative to the FIG. 1 position.

FIG. 2 is a perspective view of sulky 3 illustrating platform 21 rotated 90° about pivot 11 relative to the FIG. 1 position. Also illustrated is grease fitting 51 on tubing 47 of pivot 13.

Figure 3:
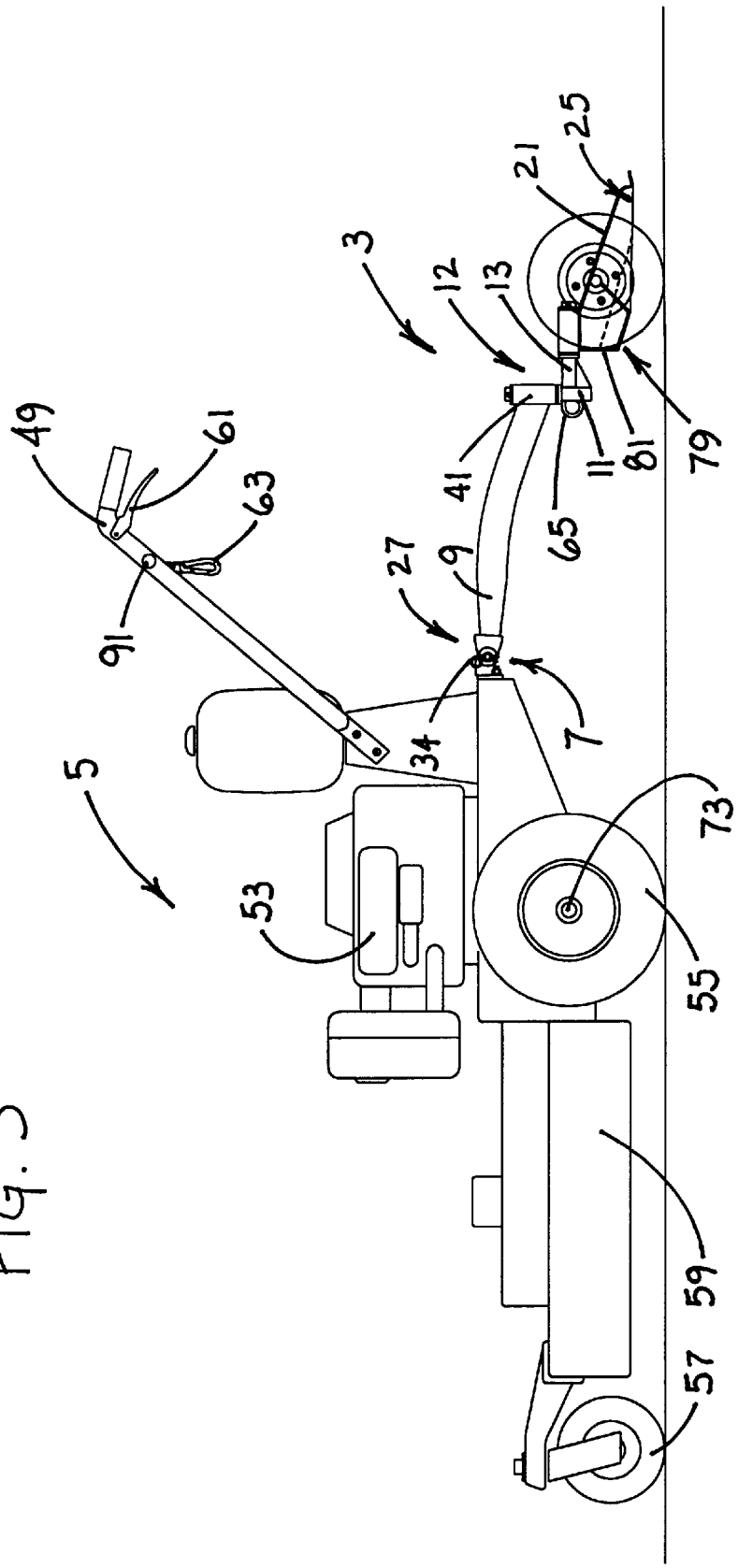
FIG. 3 is a side elevational view illustrating the two-wheeled sulky device of FIGS. 1–2 attached to the self-propelled power mower with sulky wheel shown transparent.

FIG. 3 is a side elevational view of mower 5 towing the sulky 3 of the FIGS. 1–2 embodiment. As illustrated, arm 9 and pivot 13, as well as upper or operator foot surface 25 of platform 21 are all arranged substantially parallel to the ground during operation of the device. Vertical pivot 11 is substantially perpendicular to the ground during operational conditions.

As shown in FIG. 3, self-propelled power mower 5 includes engine 53, separately powered rear drive wheels 55, front wheel(s) 57, mower deck 59 below which the cutting blade is rotatably connected to cut grass and the like, and operator controls 61 mounted on handle bars 49 for permitting the standing operator supported on platform 21 to control mower 5 using his hands. Also included on or between the handle bars of mower 5 is hanging link member 63 to which sulky 3 is connected by ring 65 during storage. Thus, sulky 3 hangs from or is suspended by the handle bars, namely link 63 by way of ring 65, during storage so that the operator may simply walk behind the mower while operating it when sulky 3 is in the storage position.

Figure 4:
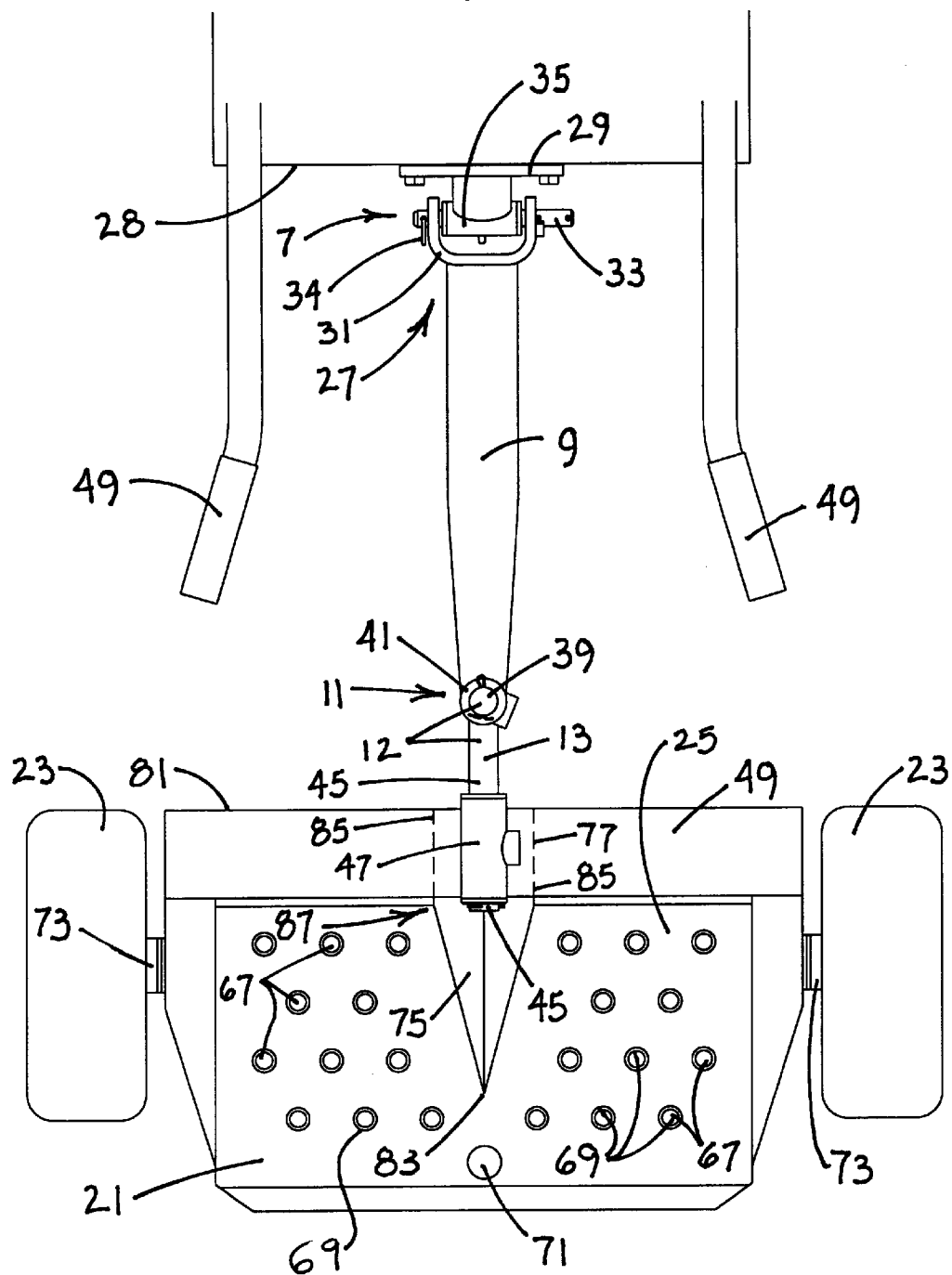
FIG. 4 is a top elevational view illustrating the sulky device of FIGS. 1–3 attached to the mower.

FIG. 4 is a top elevational view of the sulky of FIGS. 1–3. As illustrated, when sulky 3 is being pulled directly behind mower 5, arm 9, and shaft 45 are substantially aligned with one another while pivots 7 and 13 are arranged substantially perpendicular to one another, and both of these pivots are oriented substantially parallel to the ground.

Sulky stand-on platform 21 includes a plurality of circular apertures 67 defined therein, with the outer edge 69 of each aperture 67 being raised relative to top platform surface 25. In addition to the array of apertures 67 in the platform, aperture 71 is defined therein for reasons to be discussed below relative to FIG. 11. Also referring to FIG. 4, each wheel 23 connected to platform 21 is rotatably mounted on a separate axle 73 affixed to the sulky platform.

Referring to FIGS. 1–12 in totality, the top surface 25 of platform 21 includes central raised area 75 which is provided so as to define a recess or notch 77 (see FIG. 11) in the bottom or underneath surface 79 of platform 21. Cut-away or elongated notch 77 defined in the underside 79 of platform 21 receives a portion of arm 9 in the storage position (see FIGS. 10–11), with the presence of elongated arm 9 in recess 77 restricting the platform's lateral movement when it is hung from link 63 in the storage position. According to certain embodiments, a sheet or tape of clear polyethylene may be wrapped around arm 9 in the area of the arm which fits into recess 77 for the purpose of maintaining uniformity of color over the years (i.e. to keep the paint from chipping).

Figure 5:
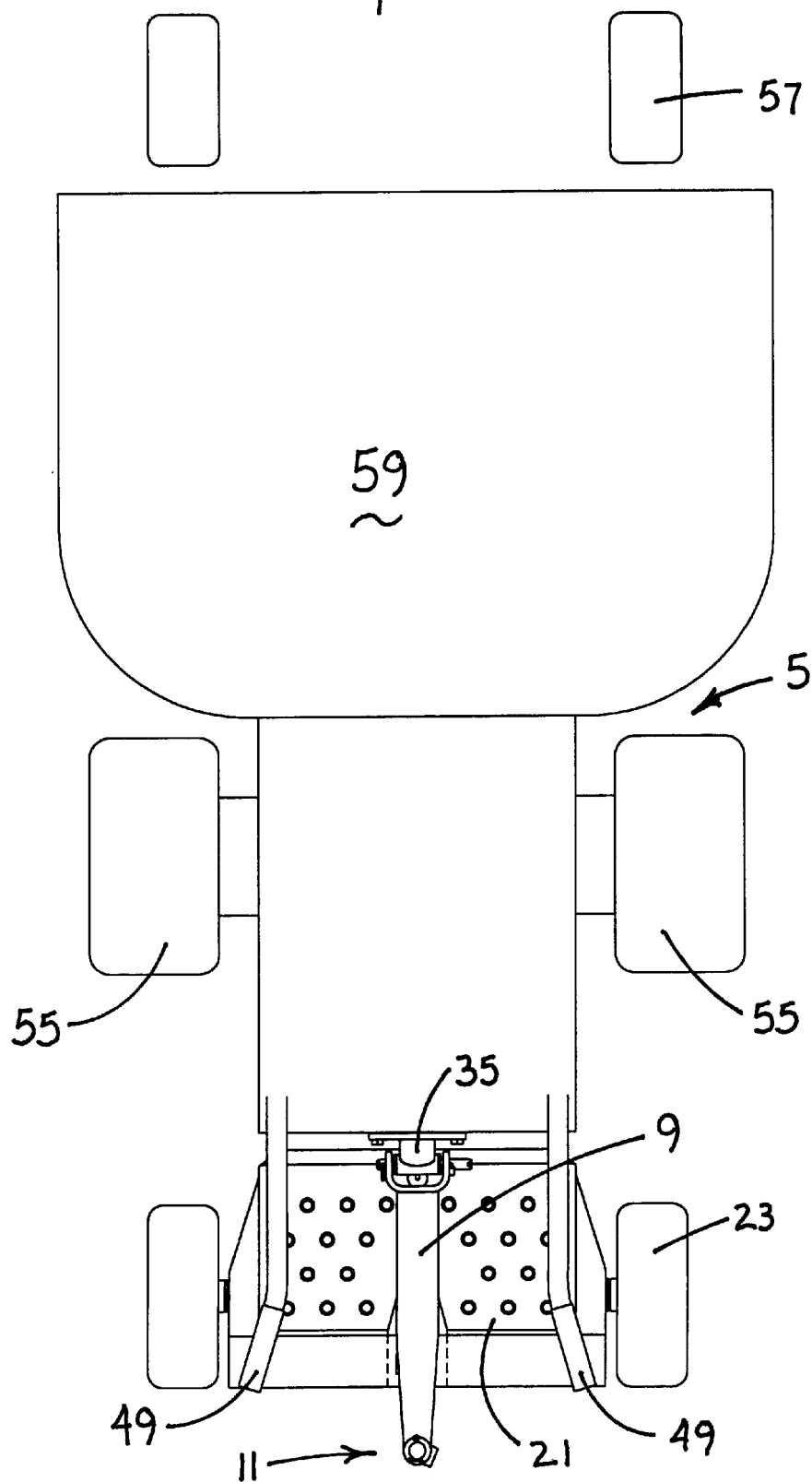
FIG. 5 is a top elevational view illustrating the sulky device of FIGS. 1–4 attached to the mower, this figure illustrating the platform pivoted 180° from the FIG. 1 position so that the platform is under the first elongated arm.
Figure 6:
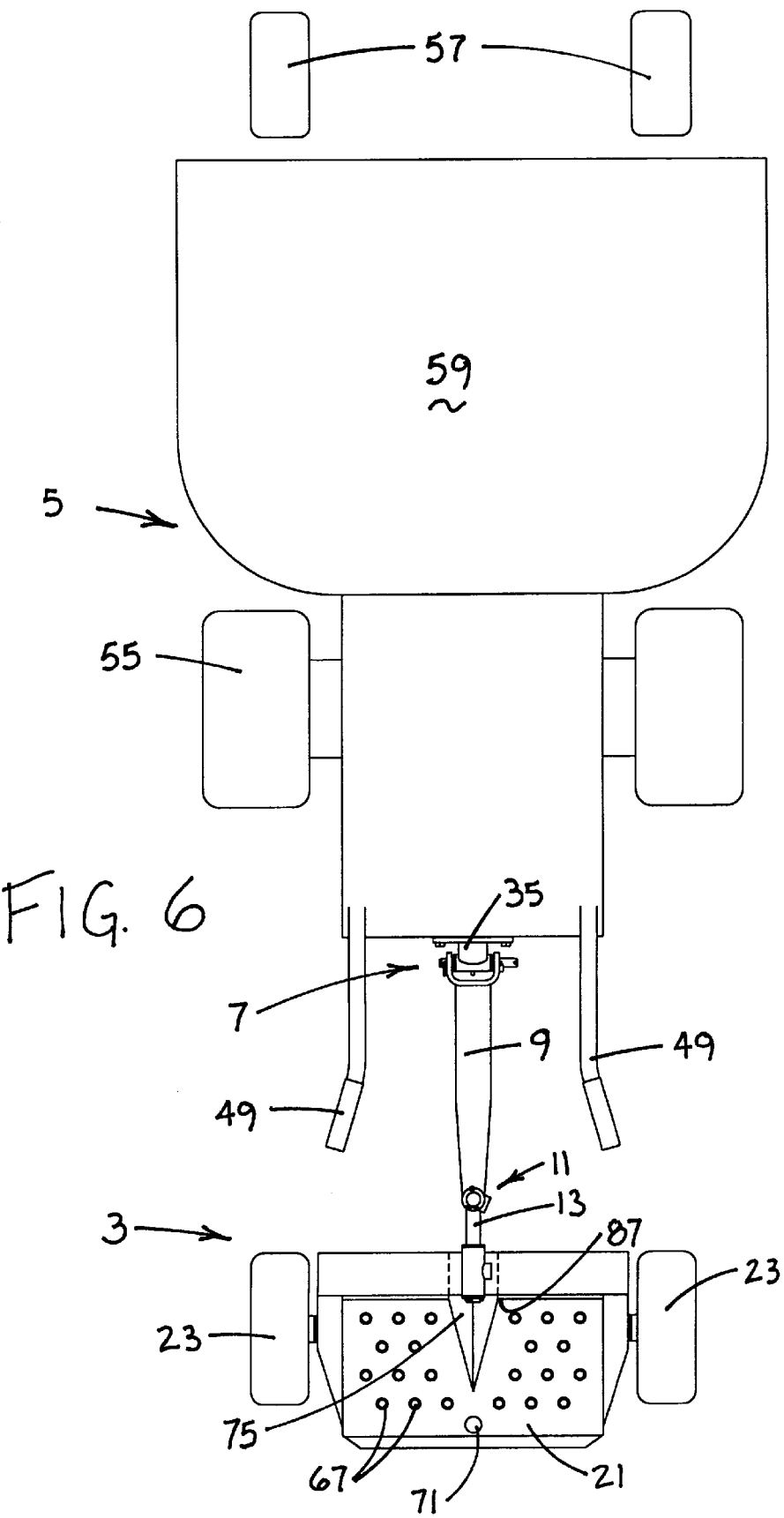
FIG. 6 is a top elevational view of the sulky device of FIGS. 1–5 attached to the mower, this figure illustrating the sulky in the FIG. 1 position.

FIGS. 5 and 6 are top elevational views of sulky 3 connected to the rear of mower 5. FIG. 6 illustrates platform 21 trailing mower 5 as it would when the operator causes the mower to move forward in a straight line. In this FIG. 6 position, pivot 13 is oriented approximately 180° about pivot 11 relative to arm 9. In contrast, FIG. 5 illustrates platform 21 swung around beneath arm 9 approximately 180° about vertical pivot 11 relative to the FIG. 6 position. Thus, FIG. 5 illustrates the position of platform 21 when the operator causes mower 5 to move in reverse in a straight line. During reverse operations, platform 21 and wheels 23 swing about pivot 11 underneath arm 9 so that during reverse operations wheels 23 normally may move substantially freely thereby not prohibiting movement of the sulky.

Figure 7:
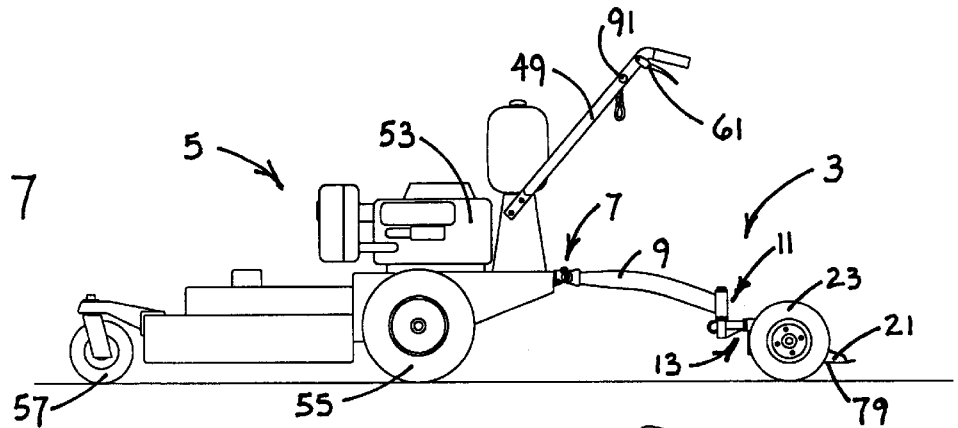
FIG. 7 is a side elevational view illustrating a sulky attached to a mower in an operational position according to an embodiment of this invention.
Figure 8:
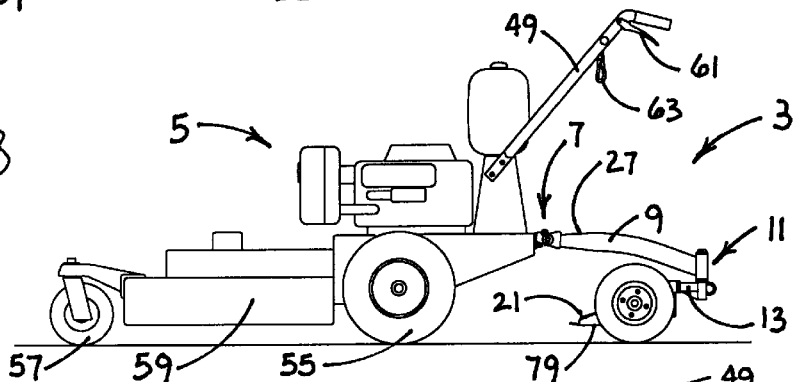
FIG. 8 is a side elevational view of a position of the FIG. 7 sulky while moving the sulky from its operational position to a storage position according to an embodiment of this invention.

FIGS. 7–10 are side elevational views of sulky 3 pivotally attached to mower 5 at horizontal pivot 7. FIG. 7 illustrates sulky 3 being pulled behind mower 5 when the operator causes the mower to move forward in approximately a straight line. Thus, FIG. 7 corresponds to the FIG. 6 top view. FIG. 8 corresponds to the FIG. 5 top view, both illustrating platform 21 and wheels 23 swung around about pivot 11 so that they are underneath elongated arm 9.

Figure 9:
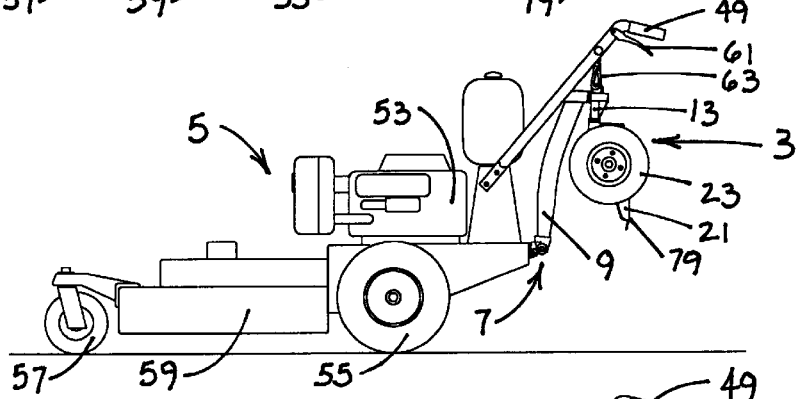
FIG. 9 is a side elevational view of the FIGS. 7–8 sulky in one storage position according to an embodiment.
Figure 10:
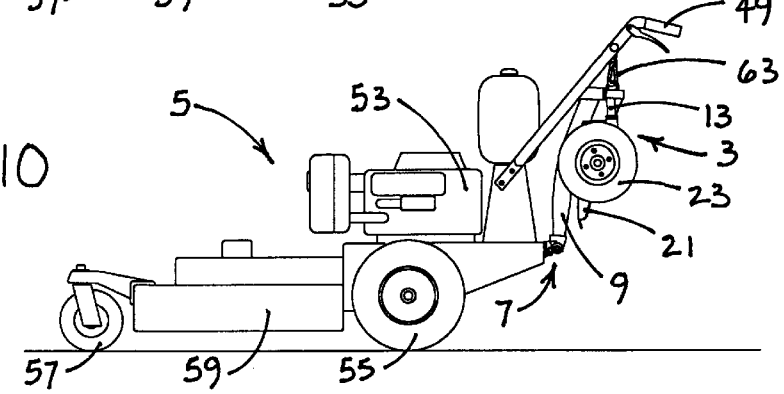
FIG. 10 is a side elevational view of the FIGS. 7–8 sulky in another storage position according to an embodiment.

FIGS. 9 and 10 illustrate two separate and different storage positions at which platform 21 and wheels 23 may be hung from link 63. In FIG. 9, the platform is hung from link 63 so that the bottom surface 79 of the platform 21 faces away from mower 5 while the foot (or top) surface 25 of the platform faces the mower and arm 9. The FIG. 9 storage position is achieved simply by lifting the sulky from the FIG. 8 position upward about pivot 7 until ring 65 may be connected to link 63.

The platform 21 in the FIG. 10 storage position is swung approximately 180° about pivot 13 relative to the FIG. 9 storage position. Accordingly, in the FIG. 10 storage position, arm 9 is received within recess 77 so that the bottom surface 79 of platform 21 faces the mower while surface 25 of the platform faces away from the mower. The FIG. 10 storage position is more compact than the FIG. 9 position, with more room for the operator to walk behind the mower and/or resulting in less required storage space for the mower and sulky.

Figure 11:
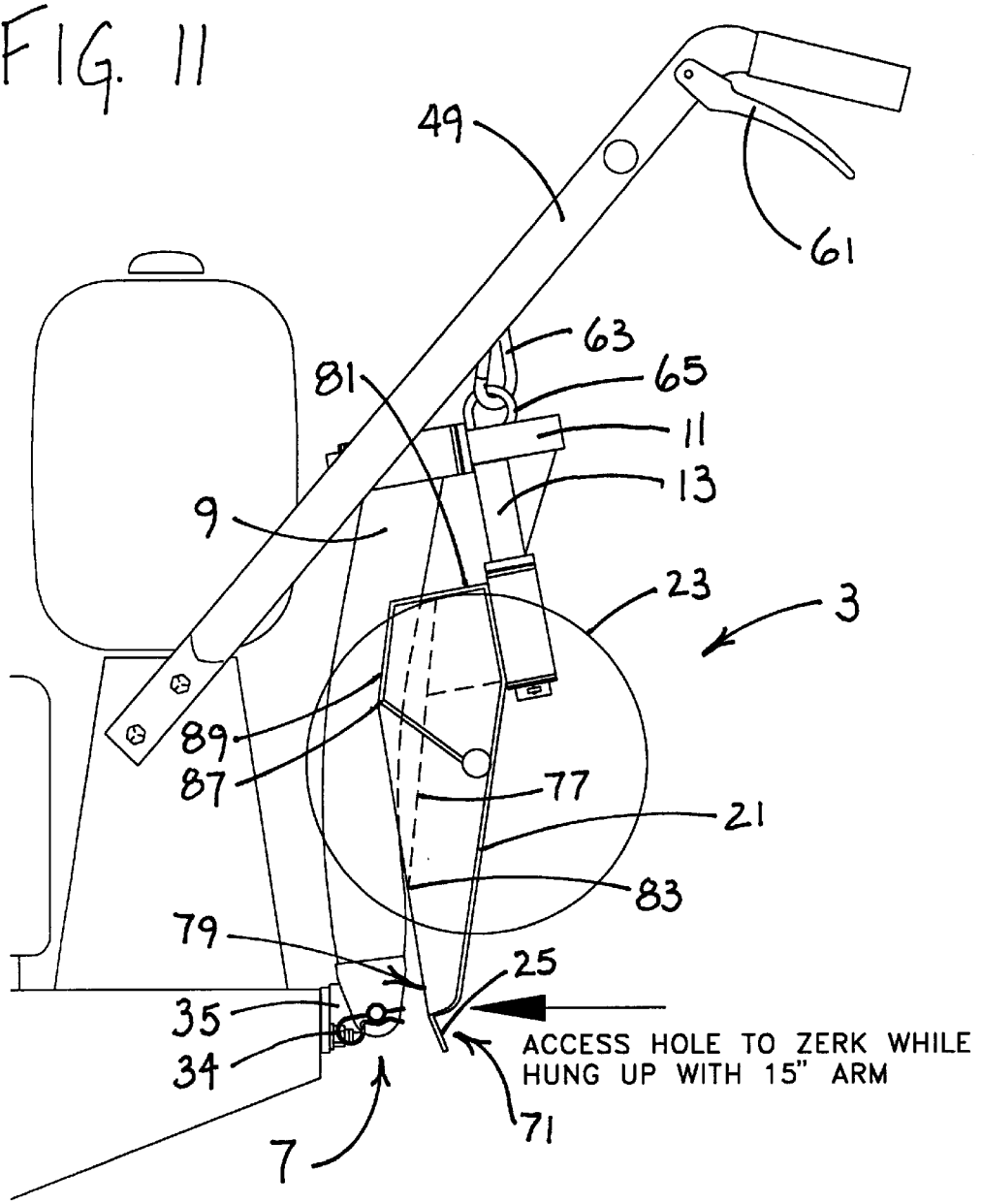
FIG. 11 is a side elevational close-up view illustrating the sulky device of FIGS. 1–10 in the FIG. 10 storage position with wheel outlined transparently.
Figure 12:
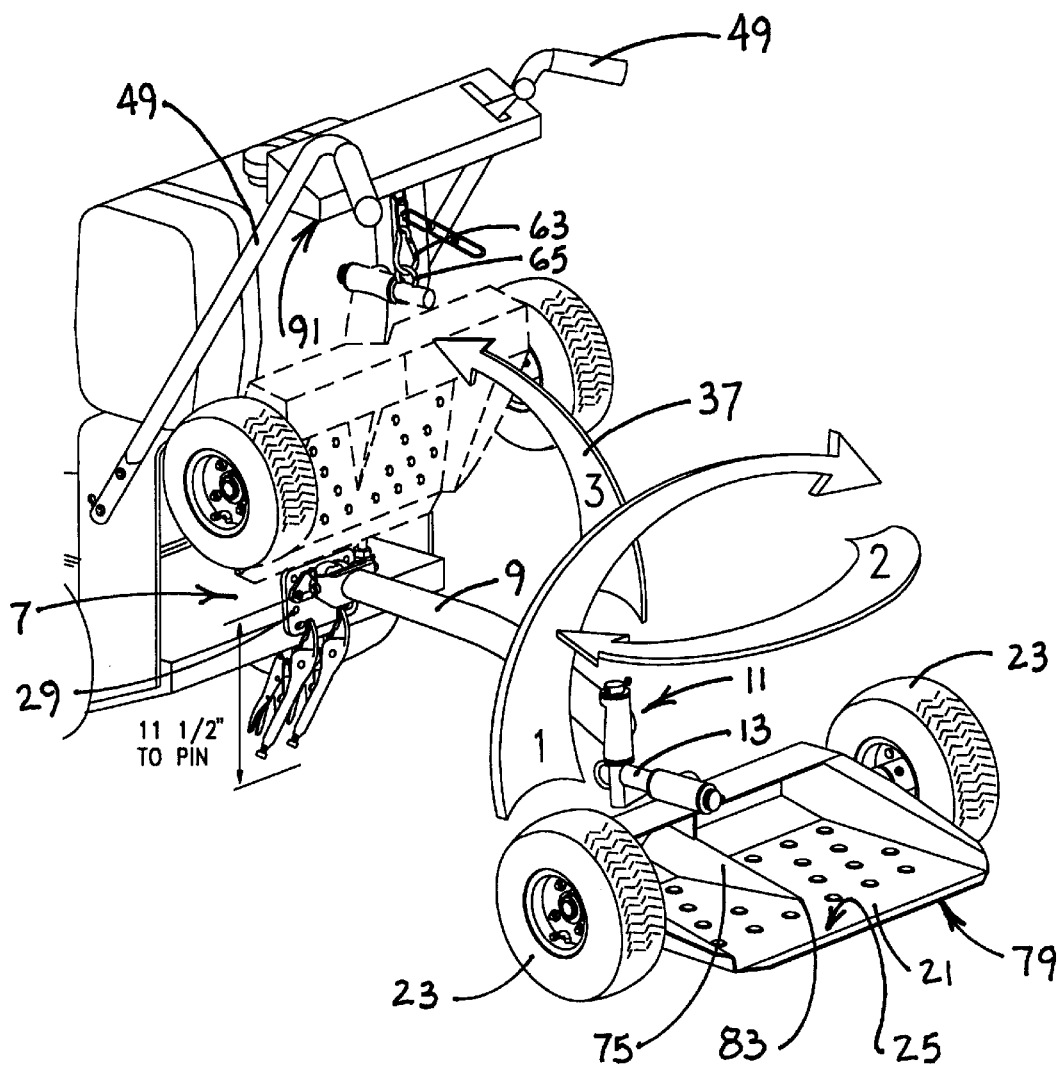
FIG. 12 is a perspective view illustrating how the FIG. 1 sulky is moved from its operating position to its FIG. 10 storage position according to an embodiment of this invention.

FIG. 11 is a side elevational close-up view of sulky 3 in the storage position of FIG. 10. As shown, ring 65 (which is attached to shaft 39 of L-shaped arm 12) permits platform 21 and wheels 23 to hang from link 63. In this particular storage position, a substantial portion of arm 9 fits within recess 77 formed in the bottom side 79 of platform 21. The area of recess 77 corresponds to raised portion 75 defined in the top surface of the platform. Thus, recess 77 is elongated in nature extending from the front 81 of the platform rearward, passing between the wheel axles until ending at apex or point 83. As shown in FIG. 4, for example, recess 77 includes opposing surfaces 85 which extend rearward from the front 81 of the platform until points 87. Points 87 corresponding to the interface between the flat portion of top surface 25 and portion 89 (see FIG. 1) which is angled upwardly relative to the remainder of top surface 25. From points 87, recess 77 is defined by opposing surfaces which angle toward one another meeting at apex 83 at a point substantially central to the platform. The resulting elongated recess or notch 77 is of a size enabling it to receive a substantial portion of arm 9 in the FIGS. 10–12 storage position. The presence of arm 9 in recess 77 limits (secures against substantial movement) the travel of the platform swinging about pivot 11 during storage thereby allowing an operator to more easily walk behind and operate the mower even while sulky 3 is stored as shown in FIGS. 10–12. As also shown in FIG. 11, zerk aperture 71 is defined in platform 21 to allow the operator to access pivot 7 when the platform is in the illustrated storage position. Arm 9 may be, for example, about fifteen inches in length.

FIG. 12 is a perspective view illustrating how an operator moves platform 21 from its operational position where the wheels contact the ground (shown in solid lines) to its FIGS. 10–11 storage position where the wheels 23 are spaced from the ground (shown in dotted lines). In this storage position, the sulky is hung from the mower via link 63, with the platform and wheels hanging below the link 63 and ring 65.

This method of moving platform 21 into the FIGS. 10–12 storage position under handle bars 49 functions to stow or secure the sulky in a compact position and/or restricts it from substantially swinging on its middle and rear pivots 11 and 13, respectively. The first step for the operator is to lift platform 21 and rotate it clockwise about horizontal pivot 13 until the left-hand wheel 23 reaches the two o'clock position (see arrow number 1). When this is done, the right-hand wheel 23 ends up going under pivot 13 and stops at about eight o'clock. Alternatively, the platform may be rotated about pivot 13 in a counterclockwise manner to a similar extent. Following this step, arm 9 is in a lifted position and angled upward about pivot 7 to a position of from about 10–40 degrees upward relative to the horizontal.

Then, still referring to FIG. 12, the operator rotates platform 21 about middle pivot 11 (see arrow number 2) about ninety degrees and simultaneously twists platform 21 so that surface 25 faces the ground (i.e. becomes substantially parallel to the ground) until recess or notch 77 (see FIG. 11) receives a portion of arm 9. At this point in the process, the platform 21 is upside down relative to its FIG. 3 operational position, with surface 79 facing upward away from the ground. Thereafter, the operator moves or pivots arm 9 along with platform 21 upward (arrow number 3) until it may be hooked to link 63 by way of ring 65 thereby securing the platform and sulky 3 in the FIGS. 10–12 storage position so that foot platform surface 25 faces away from the mower. When in this storage position, platform 21 is disposed substantially between pivot 13 and arm 9 (e.g. see FIG. 11).

According to certain embodiments, plate 29 is secured to the rear vertical surface 28 of mower 5 with the center line of the hitch pin 33 being about 11.5 inches from the ground (or from about 11–12 inches). Link 63 used for affixing the sulky in its storage position may be affixed to a horizontal member 91 affixed between handle bars 49 as shown in FIG. 12, or alternatively affixed to the handle bars.

Figure 13A:
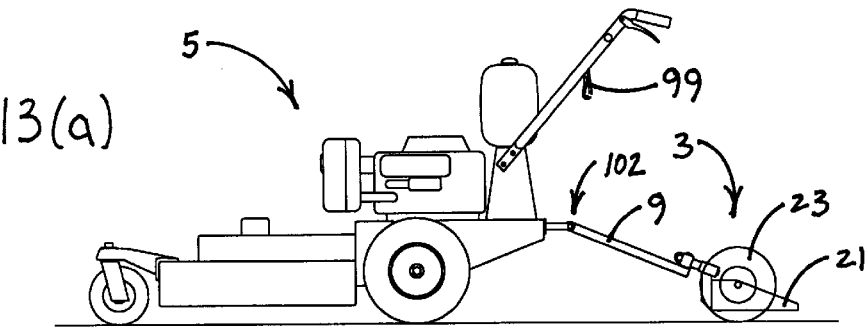
Figure 13B:
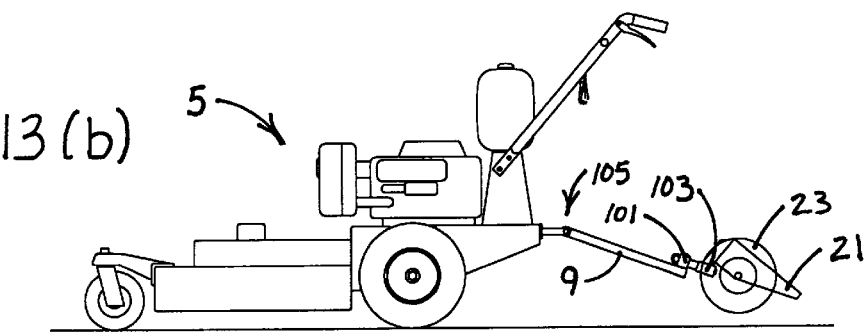
Figure 13C:
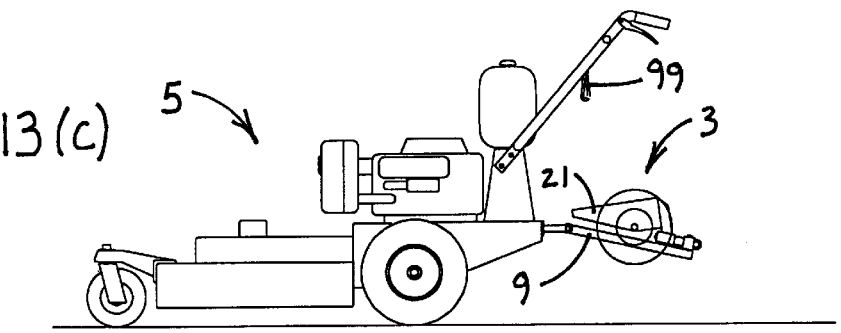
Figure 13D:
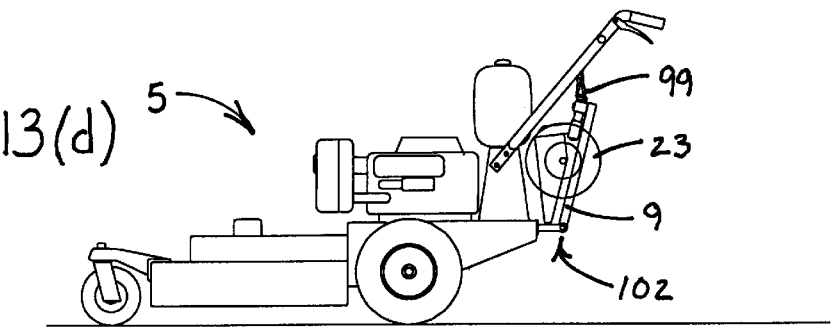

FIGS. 13(a)–13(d) illustrates a two-wheel sulky 3 according to another embodiment of this invention being moved from the FIG. 13(a) operating position in which wheels 23 contact the ground to the FIG. 13(d) storage position in which the underneath side of platform 21 faces mower 5 when the sulky is hung from the mower handlebars by way of link 99. The two-wheeled sulky shown in FIGS. 13(a)–13(d) includes front arm 9 pivotally attached 102 to mower 5, vertical (±about 30°) pivot 101, and horizontal (± about 30°) pivot 103. FIG. 13 (a) illustrates sulky 3 in the operational position with wheels 23 contacting the ground. In order to move the sulky 3 to the storage position, as shown in FIG. 13 (b), platform 21 is lifted by the user and rotated (in either direction) about 180° about horizontal pivot 103 so that the underneath or bottom side of the platform now faces away from the ground as shown in FIG. 13(b). Thereafter, as shown in FIG. 13(c), the now upside down platform 21 along with wheels 23 are swung about 180° about vertical pivot 101 and the platform manipulated so that optionally the wheels straddle arm 9 so as to come to the position shown in FIG. 13(c). Thereafter, sulky 3 is pivoted upward about pivot 102 or 105 and then hung from the handlebars by way of link 99 as shown in FIG. 13 (d). This is the storage position. Thus, as shown in FIG. 13(d), the underneath or bottom side of platform 21 faces the mower while the foot supporting side of the platform faces away from mower 5.

Once given the above disclosure, many other features, modifications, and improvements will become apparent to the skilled artisan. Such other features, modifications, and improvements are therefore considered to be a part of this invention, the scope of which is to be determined by the following claims.

I claim:

1. A stand-on sulky adapted to be attached to a self-propelled power mower for transporting a standing operator, the stand-on sulky comprising:

a first elongated arm arranged substantially parallel to a ground surface during sulky operation, said first arm having a first end and a second end, said first end to be attached to the self-propelled mower at a first pivot member with its axis arranged substantially horizontal relative to the ground, and said second end forming part of a second pivot member;

said second pivot member having an axis oriented substantially vertical relative to the ground during operation of the sulky; and a third pivot member connected to a platform for supporting feet of the standing operator so that said platform and third pivot member are operably connected to said second pivot, said third pivot member being located at an elevation below said first arm and substantially parallel to the ground during sulky operation.

2. The sulky of claim 1, further comprising an arm that forms part of said second pivot member and part of said third pivot.

3. The sulky of claim 2, wherein said platform supports a pair of wheels, and wherein said platform and said pair of wheels are pivotable more than 220° about said second pivot member.

4. The sulky of claim 3, wherein said first arm includes a first hollow tubing member at its second end for forming part of said second pivot member, and said platform includes a second hollow tubing member affixed thereto which forms part of said third pivot member.

5. The sulky of claim 1, wherein said platform includes a notch defined in its underside surface, said notch for receiving a portion of said first arm therein when said platform is in a storage position.

6. The sulky of claim 1, further comprising means for allowing said platform to be moved from an operational position to a storage position, said means also for allowing said platform to be hung from the mower in said storage position so that an underside of said platform is adapted to face the mower and a feet receiving side of said platform faces away from the mower, and said first arm is disposed at least partly between two wheels attached to the platform in the storage position.

7. A stand-on sulky device for attachment to a self-propelled power mower, the stand-on sulky comprising:

a stand-on platform for supporting feet of a standing operator;

first and second wheels attached to said platform;

a first elongated arm oriented substantially parallel to a ground surface during operation of the sulky, said first arm including a first end to be attached to a hitch at the mower defining a first pivot, and a second end attached to a second pivot;

a second arm having a portion thereof oriented substantially parallel to the ground and below the first arm during sulky operation, said second arm forming part of a third pivot and including a first end attached to said second pivot and a second end connected to the platform via the third pivot;

wherein said first arm and said hitch attached thereto are substantially longer than said portion of said second arm oriented substantially parallel to the ground so that the operator may remain substantially centered behind the mower during turns; and wherein said second pivot allows said platform to swing relative thereto.

8. The sulky of claim 7, wherein second arm is located below said first arm during sulky operation, and said first arm and hitch is at least about twice as long as said second arm; and said second pivot allows said platform to swing 360° thereabout.

9. The sulky of claim 8, wherein said first arm is at least about three times as long as said second arm.

10. The sulky of claim 9, wherein said second arm is substantially L-shaped and further includes a substantially vertically arranged arm portion forming part of said second pivot.

11. The sulky of claim 7, wherein said second pivot allows said portion of said second arm to swing 360° thereabout and underneath said first arm.

12. The sulky of claim 11, wherein said wheels and said platform are of a size enabling them to swing 360° with said portion of said second arm underneath said first arm about said second pivot.

13. The sulky of claim 12, further including means for allowing said platform and wheels to be moved from an operational position where the wheels contact the ground to a storage position where said first arm is arranged between said wheels and a foot-receiving side of said platform is adapted to face away from the mower.

14. The sulky of claim 13, wherein an underneath or underside of said platform defines a notch or recess therein for receiving said first arm when in the storage position so as to restrict swinging movement of said platform.

15. A stand-on sulky device for attachment to a self-propelled power mower, the stand-on sulky comprising:

a stand-on platform for supporting feet of a standing operator, said platform including an underside that faces the ground during normal sulky operation and a top side that receives feet of the operator;

said platform including a front end adapted to be closest to the mower during straight driving conditions, and a distal end opposite from said front end;

a first elongated arm, said first arm including a first end to be attached to a hitch at the mower defining a first pivot that defines a first pivot axis, and a second end attached to a second pivot, said second pivot defining a second pivot axis that is substantially perpendicular relative to said first pivot axis;

a second arm having a portion thereof at an elevation below the first arm during sulky operation, said second arm forming part of a third pivot, said third pivot defining a third pivot axis oriented substantially perpendicular to said second pivot axis during normal sulky operation; and wherein when said sulky device is pivoted upward about said first pivot axis, from an operational position toward a storage position, said platform is maneuverable so that said underside of said platform may face the mower and the top side of said platform may face away from the mower when the sulky is in the storage position, and when the platform is in the storage position the distal end thereof is closer to a ground surface than the front end.

\* \* \* \* \*